United States Patent Office  3,202,341
Patented Aug. 24, 1965

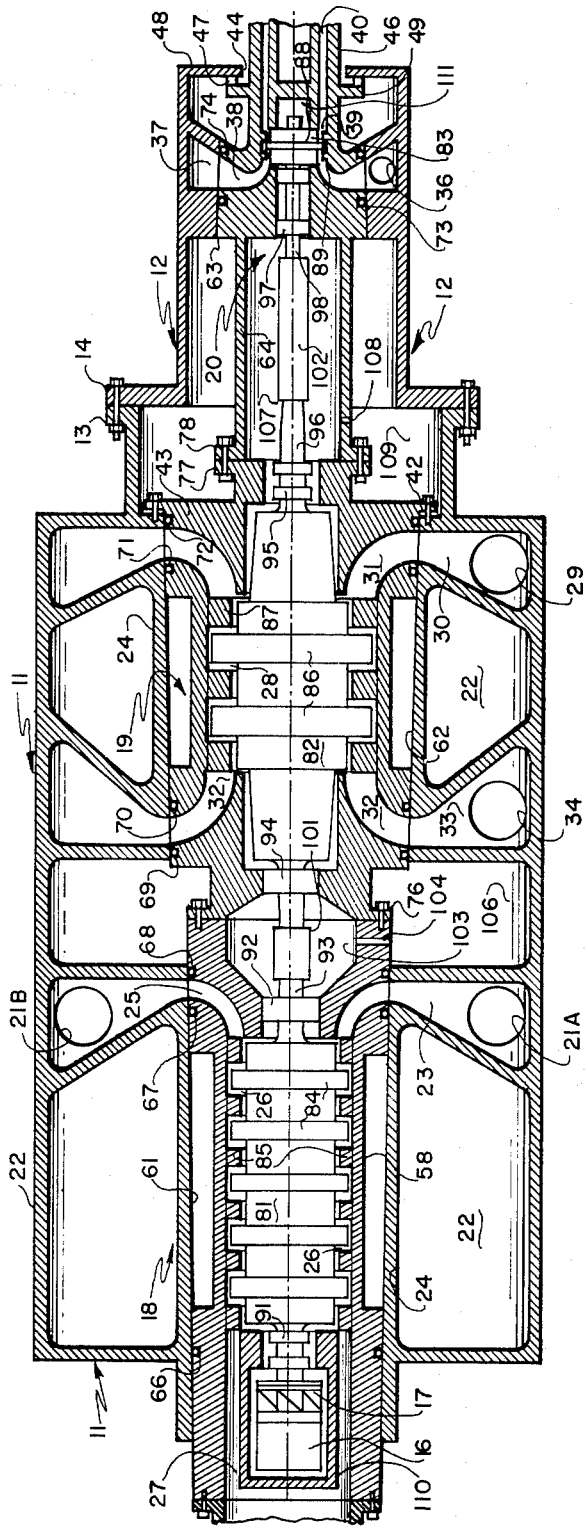

3,202,341
TURBOMACHINES ASSEMBLY
James K. La Fleur, Hermosa Beach, Calif., assignor to The La Fleur Corporation, Torrance, Calif., a corporation of California
Filed Apr. 18, 1963, Ser. No. 274,045
12 Claims. (Cl. 230—116)

The present invention relates to a construction assembly of a plurality of turbomachines in coaxial relationship so as to minimize the need for rotary seals between such machines, and to minimize the length and number of seals between the working medium and the atmosphere, and so as to provide for extensive subassemblies and ease of separation of such subassemblies. More particularly, the present invention applies when such assembly is one of turbines and compressors.

In the prior art of multiple stage turbines and multiple stage compressors, it has been the practice to split the casings thereof on an axial plane. This has resulted in the use of a large number of bolts to secure the casing halves together, and in many leaks and sealing difficulties. Further, such construction requires much time when it is necessary to open and close the casings. Further, such prior construction, as a practical matter, requires all of the conduit and instrumentation connections to be made to the bottom half of the casing, and where inlet and outlet passageways must be provided which surround the rotors of the machines, such must be provided in the top half of the casing. Such requirements increase the complexity of construction and the difficulty of sealing the casing. This sealing problem is greatly increased when the working medium is a gas such as hydrogen or helium. These gases are much more costly than water, carbon dioxide, or combustion products, and hydrogen is very explosive. Helium will leak in large quantities thru a structure where most fluids would not leak at all or in very small amounts.

Further, this leakage becomes a substantial loss when it is to the atmosphere as is the situation when each of the axially coupled turbomachines has a casing separate from the others, and that has to be provided with a rotary seal wherever a shaft extends thru such a casing. Such rotary seals are a constant source of maintenance and leakage on turbines. This is not to say that the present machines are not supplied with rotary seals on their shafts, however, small leakages thru such seals are not of importance as the gas from such leakage is not lost to to the atmosphere.

The defects of the prior art and the achievement of the present invention may be summarized by stating that the length of the outside seals and gaskets of the present invention are short as compared with those of the prior art. This shortening of the outside seals, the seals between the working medium and the atmosphere, of turbomachinery is an object of the present invention.

A further object of the present invention is the elimination of working medium gas loss thru rotary seals.

Another object of the invention is construction of turbomachinery so that the parts thereof may be easily separated for inspection and repair. A part of this object is the construction of such machinery so that it comes apart on the basis of large subassemblies.

Specifically, it is an object of the present invention to couple a plurality of turbomachines together in end-to-end coaxial arrangement of stators and rotors to provide a subassembly, and to provide a housing for such subassembly which is designed to receive such subassembly by axial movement thereof into such housing, such housing to carry all the supply and instrumentation connections for such machines.

The above mentioned and other defects of the prior art remedied and these objects, and others that will be apparent, achieved by constructing a housing that has a more or less conical bore from one end to the other. This bore may be considered to be formed by a series of cylindrical surfaces or surfaces of revolution that are reduced in diameter progressively from one end to the other of the bore. The rotors and stators of the machines are combined into one unit and inserted into the housing as a subassembly. Annular seals such as O-rings or rectangular piston rings provide the sealing means between the subassembly and the housing at various stations along their length. One or more removable caps may close the end openings of the housing or the subassembly may be capped and reliance for sealing placed on the annular seals between housing and subassembly.

A turbomachines assembly as described briefly above is illustrated in the accompanying drawings, in which:

FIGURE 1 is a longitudinal axial section view of a turbomachines assembly illustrating the present invention.

FIGURES 2 and 3 are enlarged views of portions of FIGURE 1 showing details of the sealing means thereof, with parts adjacent such seals broken away.

The drawings of FIGURE 1 illustrates the present invention by a showing of a longitudinal sectional view thru an assembly of housing, stators, and rotors of a turbomachine comprising two multistage turbines, a multistage compressor, and a starting motor, all in coaxial end-to-end arrangement. In the detailed description hereinafter, the turbomachinery will be exemplified as a gas turbine and compressor using helium as a working medium.

In the illustration of FIGURE 1, the housing has been divided into two parts, a stationary part 11 and a movable part 12 which functions as a cap for the larger of the two open ends of the fixed part of the housing. The stationary and the movable cap parts of the housing are joined together at transaxial openings by flanged rings 13, 14, and these rings may be used to designate the respective adjacent openings of fixed and movable casing parts. Both casing parts are formed with annular chambers acting as transit conduits between the turbomachines' blade passages and the piping, or conduits, external to the machines which have not been shown. The basic operating units of the assembly are: from left to right of the drawing, a starting hydraulic motor 16 having therewith a one-way clutch 17, both shown schematically, the fluid lines from an external pump to the motor have not been shown; and next in order is a compressor 18, then a hot turbine 19, both located in the fixed part 11 of the casing, and finally a cold turbine 20 located in the movable part 12 of the casing. The compressor and the turbines are each multistage machines in which stationary blades alternate with rotating ones.

The functioning of the compressor and turbines may be outlined by orientating the gas flow therethru. Gas for compression is supplied to the fixed housing thru inlet openings 21A, 21B in the outer cylindrical shell 22 of the housing 11. The axes of the gas openings in the housing should be tangential to the outer shell 22. The compressor inlet openings 21 communicate with an annular plenum 23 formed in the housing. This plenum tapers radially inward of the housing to where it passes thru the inner shell 24 of the housing thru a curved annular slot 25 that delivers the gas to the compressor's blade passage 26. From the blade passage, the gas passes out of the assembly to the left thru an annular, cylindrical sleevelike outlet passage 27 that is a continuation of the blade passage. The hot turbine's blade passage 28 receives high pressure hot gas thru an inlet opening 29 in the outer shell 22, a plenum 30, and a curved annular slot 31, all similar to those of the compressor. From the blade passage 28 the gas leaves thru a curved annular slot 32, outlet plenum 33, and outer shell opening 34, all mirror images of the inlet, except for the design requirements resulting from pressure and temperature changes in the gas, but not shown in the present drawings. The movable part 12 housing the cold turbine 20 has an inlet opening 36 which communicates with an annular plenum 37 that is of much the configuration of the others. This plenum is connected by a curved annular slot 38 to the cold turbine blade passage 39. From the annular blade passage, the gas leaves the housing to the right thru an annular discharge passage 40 that is a continuation of the blade passage.

The stators and rotors of the compressor and of each turbine each form a separate subassembly, and these subassemblies are joined together in end-to-end axial alignment into a larger subassembly that can be moved into and out of the fixed and movable housing parts 11 and 12 by relative axial movement therebetween when the housing flanges 13, 14 are unbolted so that the movable cap 12 can be axially moved from the fixed housing 11. The compressor and turbine stators and rotors are held to and in the stationary casing 11 by a ring of bolts in a locating flange 42 on and near the right hand end of the stator 43 of the hot turbine 19, just inside of and adjacent the fixed housing flange 13. The movable cap 12, or housing, may be removed from the cold turbine because the inside thereof tapers from the flange 14 either continuously or in steps to its right hand end where there is an opening 44 thru which projects a conduit 46 having formed therein the annular discharge passage 40 for the cold turbine 20. Adjacent this right hand opening of the cap is a compression seal 47, or gasket, that is clamped against the inside of the end flange 48 of the cap by a flange 49 carried by and externally of the discharge conduit 46. This compression seal 47 seals the right hand end opening of the combined housings 11, 12 and allows for some relative endways movement of the stators and rotors relative to the housings.

The seals preventing or minimizing longitudinal leakage of gas, that is leakage in a direction axially of the turbines, along the meeting surfaces between the casings and the stators of the machines, are ring type seals that rest in annular grooves in the circumferential portions of the stators. Enlarged from FIGURE 1 to substantially full scale, two types of such sealing rings are illustrated in FIGURES 2 and 3 by sectional views made by a plane containing the axis of the machines, as in FIGURE 1, and with parts adjacent the seals broken away. FIGURE 2 illustrates the use of a compound metallic ring which is of much the form used for sealing internal combustion engine pistons, a piston ring assembly. In the illustration, the ring is in an annular ring groove 51 cut in a cylindrical surface of the stator 43 of the hot turbine. This annular groove is closed on its open face by a closely fitting portion of the fixed housing inner shell 24. The surfaces of the stator and the housing contiguous the groove may be cylindrical as illustrated in FIGURES 2 and 3 or they may by slightly conical as it would appear from FIGURE 1. This ring is a split ring comprised of three parts, a ring 53 which is square in cross section with one face bearing against the housing, another ring 54 which is a right angle in cross section with the square ring resting in the angle and with the edge of one leg of the angle bearing on the housing surface, and a spring ring 55 which is placed in the bottom of the groove 51 to exert pressure against a leg of the angle ring 54 to push it and the square ring 53 outward against the adjacent housing surface. This spring ring has a wavey form peripherally thereof, and is usually made from a thin strip of resilient material. All of these ring parts are discontinuous peripherally for placement in a groove and so that they may expand and contract under the influence of the spring ring and of temperature changes in the machine parts, and to accommodate for changes in the internal diameter of the housing as the stator in which they are placed, moves radial or axially with respect to the housing, whatever the reason for such movement.

The seal illustrated in FIGURE 3 is of the O-ring type. These rings are made of rubber like compositions, are round and solid in cross section when not stressed, and usually continuous circumferentially. This form of seal is used with the compressor 18 and the cold turbine 20 while the form of FIGURE 2 is used with the hot turbine as the metallic seal withstands the high temperatures of the hot turbine, and the O-rings are better adapted for the compressor and cold turbine. In FIGURE 3, there is shown in cross section a ring groove 57 formed in the circumferential face of the stator, be it compressor or cold turbine, but for illustration the stator 58 of the compressor. The open face of this groove is closed by adjacent portions of the inner shell 24 of the housing 11. The O-ring 59 lies in the groove 57. The depth and width of the groove are proportioned to the thickness of the ring so that the ring firmly contacts the housing when stator and housing are assembled together. The groove is wide enough to allow for compression of the ring when the parts are assembled. As with the metallic seal ring, the opposed surfaces of the stator and housing may be cylindrical, as shown, adjacent the ring groove in FIGURES 2 and 3 or may be conical as they appear to be in FIGURE 1. In either case, the assembly must be such that there is clearance for relative expansion between the parts, whether such expansion is radial or axial.

Seals of the types shown in FIGURES 2 and 3 allow the machine to be constructed with such clearances and, yet, to seal clearance spaces against the travel therethru of gas or lubricating oil. Such spaces are composed of the outer surfaces of the stator of the turbomachines in opposition to the inner surfaces of the housings of the present invention. Such surfaces have been generally indicated in the drawing of FIGURE 1 by a reference numeral applied to the axially counterposed intercept lines of such surfaces with the sectional plane. The meeting surface of stator and housing in the compressor may be designated as the intercept line 61 of the internal surface of the inner shell 24 of the housing 11. In the hot turbine, the intercept line 62 is, also, the internal surface of the adjacent portion 24 of the housing 11. In the cold turbine, the intercept line 63 is short with respect to the total axial length of the housing, and is only formed by a portion of the internal surface of the housing 12 where it is adjacent the outside of the cold turbine stator 64. As is apparent from FIGURES 1, 2, and 3, these intercept lines may be formed by the intersection of continuous or discontinuous conical surfaces, by stepped, or discontinuous, cylindrical surfaces, or by combinations of conical and cylindrical surfaces. Generally, such surfaces will be surfaces of revolution, but may even include ellipsoidal surfaces. The criteria being that the diameter of the meeting surfaces is reduced in the direction of insertion of the stators into the housings.

In FIGURE 1, an annular seal 66, such as the O-ring 59 of FIGURE 3, has been located adjacent the left hand end, as shown, of the compressor 18 to seal it against the atmosphere. Also, in the compressor there is another such annular seal, 67, 68 at each side of the compressor inlet annular slot 25 at the compressor intercept 61 as it passes from the housing to the stator and the blade passage 26. Similarly, in the hot turbine 19 there is an annular seal, such as the ring assembly of FIGURE 2, at each side 69, 70 of the inlet and at each side 71, 72 of the outlet slot adjacent the hot turbine intercept 62. Again, in the cold turbine 20, there is one of the O-ring annular seals 73, 74 at each side of the gas inlet slot 38 adjacent the intercept 63 of the turbine housing 12 with its stator 64. The right hand end of the cold turbine is sealed with the compression seal 47 around the turbine outlet conduit 46.

The three turbomachines are held together by rings of bolts so that once the ring of bolts are removed from housing flanges 13, 14 and the movable housing cap 12 removed from the cold turbine 20, all the stators and their rotors may be moved as a single unit axially out of and back into the fixed housing 11. The tapered or stepped nature of the stators and the opposed interior surfaces of the housings makes this possible. Further, such stepping or tapering means that the various ring seals need slide but short distances on the housing interior before they reach their final position. The hot turbine stator 43 has at its left hand end a flange 76 that is bolted to the right hand end of the compressor stator 58; and the hot turbine and the cold turbine stators are bolted together at and by their contiguous flanges 77, 78.

The starting motor 16 and the clutch 17 have been illustrated by conventional symbols, and the illustration of details of the turbomachines, also, is by conventional symbols, or means. The compressor rotor 81, the hot turbine rotor 82, and the cold turbine rotor 83 are all shown in full view, not sectioned, and the rotor blading indicated by annular rings in all the machines. The fixed blading of the machines, the blades attached to the stators are between the rotor blade rings and have been cross hatched to indicate that they are part of the stators. There are shown five such rotor blade rings 84 and six such fixed blade rings 85 in the compressor, two rotor rings 86 and three fixed rings 87 in the hot turbine, and one rotor blade ring 88 and two fixed blade rings 89 in the cold turbine. The above numbers of blade rings is only illustrative. However, all of the machines are axial flow and multistaged. The compressor has a bearing assembly 91, 92 for the rotor adjacent each end of its shaft 93 thereof. Similarly, the hot turbine has a bearing assembly 94, 95 at each end of its rotor shaft 96. The cold turbine has a single bearing assembly 97 adjacent the left hand end of its shaft 98. Each of the machines has its own shaft and these shafts are joined together by means of splined sleeves for the transfer between the machines. The compressor shaft 93 is joined to the hot turbine shaft 96 by a splined sleeve 101, or coupling, and the cold turbine shaft 98 is joined to the hot turbine shaft by a long splined sleeve 102, or coupling. This latter sleeve is long and the two turbines spaced relatively far apart to reduce heat transfer from one to the other. With this arrangement, the three shafts of the machines are rotated as a single unit, but can be easily separated for servicing.

The various bearing units and splined sleeves are provided with oil supply means which have not been shown. However, the spaces between the turbomachines serve, as one of their purposes, to collect oil from the adjacent bearings. The space 103 inside of the compressor and hot turbine stators between their adjacent end bearings 92, 94 and surrounding the shafts' connecting splined sleeve 101 acts as one such oil collecting space. Oil from this space 103 may drain thru an opening 104 in the bottom of the space 103 to a sump 106 formed therebelow in the housing. Oil may be removed from this sump in any suitable manner. In a similar manner, oil from the adjacent hot and cold turbine bearings 95, 97 can collect in the space 107 surrounding the hot-cold turbine splined sleeve 102 and inside of the turbine stators. This latter space can drain thru an opening 108 into a sump 109 formed by the adjacent parts of the fixed and movable housing units, and the oil collecting in such sump may be removed therefrom in any suitable manner. The spaces between the ends of the rotors and the stators are made as small as possible, and various types of seals may be provided between the moving and fixed parts, as along the shafts, to reduce the leakage of gas from the various blade passages 26, 28, 39 to passage along the shaft ends. In the present disclosure, the outer shaft ends are in blind chambers such as the chamber 110 at the left hand end of the compressor shaft 93 which houses the starting motor 16 and the clutch 17. That is, this chamber is blind as far as the shaft is concerned as the end of the shaft does not extend outward thereof into the atmosphere. Similarly, the right hand end of the cold turbine shaft ends in a blind chamber 111. Leakage of gas from the housings is a serious problem when such gases as hydrogen or helium are being used as the working medium for the turbomachines. As to hydrogen this is due to its combustability with the oxygen in the air surrounding the housing, and as to helium this is due to its relatively high cost. With the closed construction of the housing, there are no rotary shaft seals thru the outer parts of the housing or the stators, and as the shaft ends between the turbomachines are enclosed in the stators and the housing, the only gas leakage that might be detrimental would be that which would occur from one machine to another in the housing.

The foregoing description when taken in conjunction with the drawings herewith discloses a construction whereby a plurality of multistage turbomachines operating with a gas working medium may be constructed so as to have a housing which is peripherally continuous, and whereby the stators and rotors of such machines may be placed in and removed from such housing as a single assembly by axial movement of such assembly. Further, among other things, such disclosure teaches how to construct a plurality of coupled turbomachines without rotary seals between the atmosphere and the gas in the machines.

Having thus described my invention, its construction and operation, I claim:

1. A multistage turbomachine, comprising: a housing, a stator, and a rotor, said stator and rotor being multistaged in construction, said stator and rotor being formed for and as an integral interior assembly unit separate from said housing and formed exteriorly to the shape of substantially surfaces of revolution, bearings carried by said assembly at the ends of said rotor for the rotational support thereof in said assembly, said housing being formed interiorly substantially to the shape of surfaces of revolution conforming to and interfitting with said interior assembly surfaces, said exterior and interior surfaces being so formed that said interior assembly may be fitting as a unit centrally of said housing by axial movement of said unitary assembly into close envelopment by said housing, and annular sealing means located between said housing and said interior assembly adjacent said surfaces.

2. The combination of claim 1 in which said interior assembly comprises a coupled power turbine and a compressor arranged in axial alignment.

3. The combination of claim 1 in which said housing is formed with a transaxial opening and in which said surfaces decrease in peripheral extent from one surface to the next from said end opening.

4. The combination of claim 1 in which said housing is formed with a gas duct that establishes communication between the exterior and the interior of said housing.

5. A plurality of axially aligned multistage gas turbomachines, each of said machines having a stator as a nonrotatable part and a rotor, bearings carried by said stator at the ends of said rotor for the rotational support thereof of in said stator, each rotor including a shaft adjacent another of said shafts, a coupling securing adjacent shaft ends portions together, a housing nonrotatable part for all of said stators and rotors, said housing comprising a fixed element and a movable element, said housing and stators being formed for assembly by axial movement of said stators in and out of said housing, said nonrotatable parts being formed to provide space contiguous to said bearings of adjacent machines and surrounding said coupling for the reception therein of fluid from adjacent rotors.

6. A turbomachine having axially aligned and coupled a multistaged compressor and a multistaged power turbine for driving said compressor, a housing containing both said compressor and said turbine, said compressor and said turbine each having a stator and a rotor multistaged in construction and formed for and as an integral unit separate from said housing, one stator with respect to one rotor, and each said unit formed exteriorly with one or more substantially cylindrical sections, said units being coupled together in axial alignment and forming an integral interior assembly separate from said housing, said housing being formed interiorly with substantially cylindrical surfaces sections conforming to said interior assembly cylindrical sections, said exterior and interior sections, and said assembly and said housing being so formed that said interior assembly may be fitted centrally of said housing by axial movement of said assembly into and envelopment by said housing, said housing formed with an end opening, said housing having its cylindrical surface sections decreasing in diameter from one surface section to the next from said end opening, and annular sealing means between said housing and said interior assembly and adjacent said section, each of said stators including bearing means supports for bearings for its associated rotor, and bearings carried by each of said bearing means supports for the rotational support of said rotors.

7. A multistage turbomachine, comprising: a housing, a stator, and a rotor, said stator and rotor being multistaged in construction, said stator and rotor being formed for and as an integral interior assembly unit separate from said housing and formed exteriorly to the shape of substantially surfaces of revolution, bearings carried by said assembly at the ends of said rotor for the rotational support thereof in said assembly, said housing being formed interiorly substantially to the shape of surfaces of revolution conforming to said interior assembly surfaces, said exterior and interior surfaces being so formed that said interior assembly may be fitted as a unit centrally of said housing by axial movement of said unitary assembly into close envelopment by said housing, and annular sealing means located between said housing and said interior assembly adjacent said surfaces, said housing being formed with a gas duct that establishes comunication between the exterior and the interior of said housing, and said housing being formed with said duct so that said duct extends completely peripherally of said housing.

8. A multistage turbomachine, comprising: a housing, a stator, and a rotor, said stator and rotor being multistaged in construction, said stator and rotor being formed for and as an integral interior assembly unit separate from said housing and formed exteriorly to the shape of substantially surfaces of revolution, bearings carried by said assembly at the ends of said rotor for the rotational support thereof in said assembly, said housing being formed interiorly substantially to the shape of surfaces or revolution conforming to said interior assembly surfaces, said exterior and interior surfaces being so formed that said interior assembly may be fitted as a unit centrally of said housing by axial movement of said unitary assembly into close development by said housing, and annular sealing means located between said housing and said interior assembly adjacent said surfaces, said housing being formed with a gas duct that establishes communication between the exterior and the interior of said housing, said stators and rotors being provided with blade passages, said duct communicating with said passages by passing between and adjacent said sealing means.

9. A turbomachine having axially aligned and coupled a multistaged compressor and a multistaged power turbine for driving said compressor, a housing containing both said compressor and said turbine, said compressor and said turbine each having a stator and a rotor multistaged in construction and formed for and as an integral unit separate from said housing, one stator with respect to one rotor, and each said unit formed exteriorly with one or more substantially cylindrical sections, said units being coupled together in axial alignment and forming an integral interior assembly separate from said housing, said housing being formed interiorly with substantially cylindrical surface sections conforming to said interior assembly cylindrical sections, said exterior and interior sections, and said assembly and said housing being so formed that said interior assembly may be fitted centrally of said housing by axial movement of said assembly into and envelopment by said housing, said housing formed with an end opening, said housing having its cylindrical surface sections decreasing in diameter from one surface section to the next from said end opening, and annular sealing means between said housing and said interior assembly and adjacent said sections, each of said stators including bearing means supports for bearings for its associated rotor, and bearings carried by each of said bearing means supports for the rotational support of said rotors, said housing being formed with a gas plenum that extends completely peripherally of said housing and establishes communication for the conduit of gas between the exterior and the interior of said housing, and between said housing and said stator and rotor.

10. A plurality of axially aligned multistage gas turbomachines, each of said machines having a stator as a nonrotatable part and a rotor, bearings carried by said stator at the ends of said rotor for the rotational support thereof in said stator, each rotor including a shaft adjacent another of said shafts, a coupling securing adjacent shaft end portions together, a housing nonrotatable part for all of said stators and rotors, said housing and stators being formed for assembly by axial movement of said stators in and out of said housing, said nonrotatable parts being formed to provide space contiguous to said bearings of adjacent machines and surrounding said coupling for the reception therein of fluid from adjacent rotors, said housing and said stators, when assembled interfitting along surfaces of revolution, and annular sealing means located between said housing and stators adjacent said surfaces.

11. The combination of claim 10 in which said machines are provided with blade passages, ducts formed in said housing and stators leading to and from said passages, said ducts leading between and adjacent and sealing means.

12. The combination of claim 9 in which said stators and rotors are provided with a blade passage and a duct communicating with said housing plenum by passing between and adjacent said sealing means.

References Cited by the Examiner

UNITED STATES PATENTS

| | | | |
|---|---|---|---|
| 2,056,553 | 10/36 | Abramson | 103—108 |
| 2,717,118 | 9/55 | Walter | 230—116 |
| 2,864,314 | 12/58 | Culleton | 103—108 |

FOREIGN PATENTS

| | | |
|---|---|---|
| 589,263 | 3/59 | Italy. |
| 320,874 | 5/57 | Switzerland. |

LAURENCE V. EFNER, *Primary Examiner.*

ROBERT M. WALKER, *Examiner.*